Patented Dec. 29, 1936

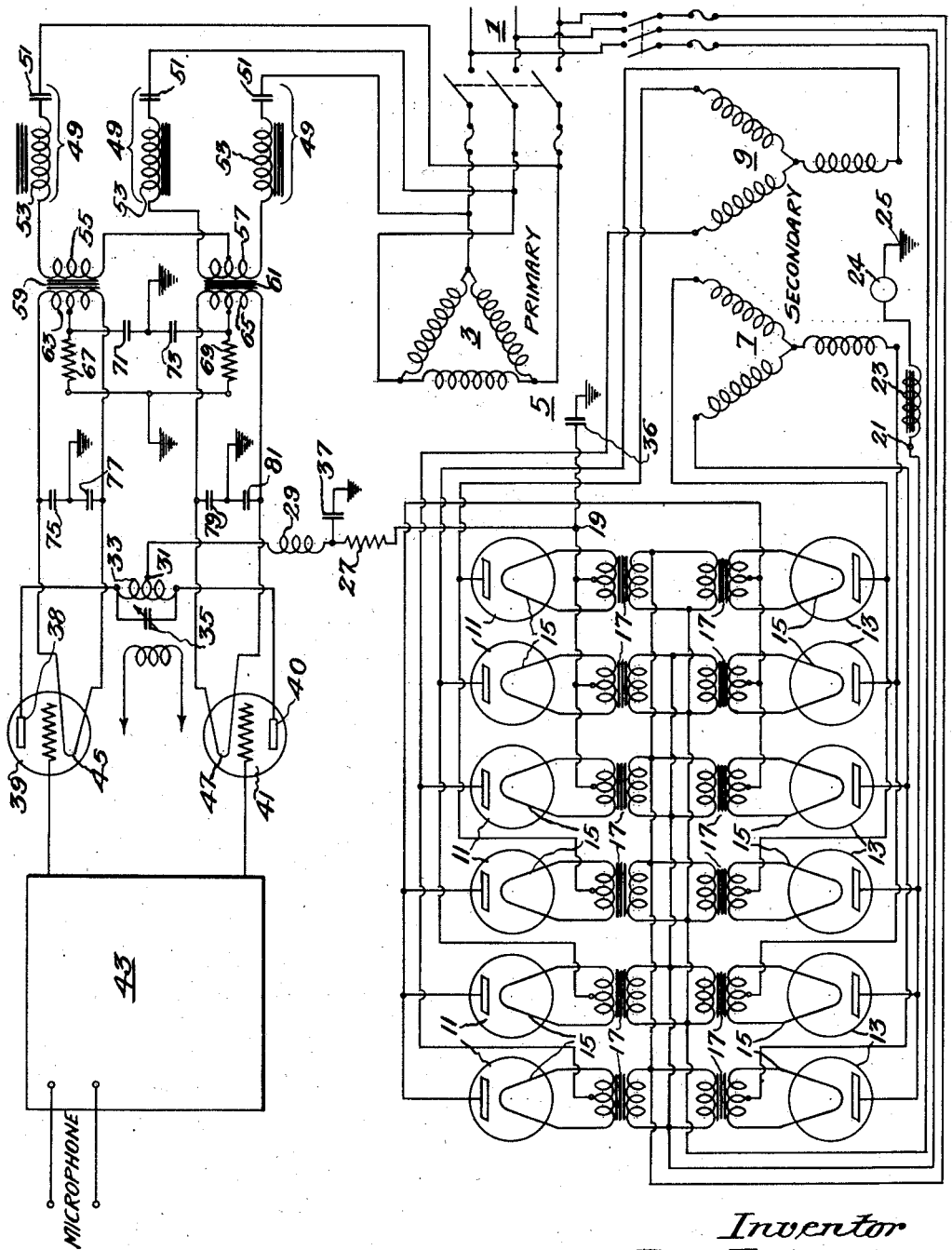

2,066,170

UNITED STATES PATENT OFFICE 2,066,170

POWER SUPPLY CIRCUIT

Loy E. Barton, Collingswood, N. J., assignor to Radio Corporation of America, a corporation of Delaware Application August 28, 1935, Serial No. 38,202

6 Claims. (Cl. 250—27)

My invention relates to minimizing hum in power supply circuits. More specifically, my invention resides in the reduction of hum caused by harmonics generated in a source of rectified alternating current, and reflected into the power lines.

One of the objects of my invention is to provide a single source of alternating current which may be rectified for the anode circuits of thermionic tubes and connected through a transformer to the filaments without deleterious hum effects.

Another object is to include an inexpensive filter to eliminate harmonics in an alternating current source.

A further object is to filter currents of harmonic frequency which are induced in the filament circuits of thermionic tubes by the rectifier which provides the direct current for their anode circuits.

Additional objects will appear in the accompanying specification and claims.

The single figure of the drawing illustrates one form of the invention.

In the drawing a source 1 of three phase alternating current is shown as being connected to the primary 3 of a transformer 5. The primary of the transformer is coupled to a pair of secondary windings 7—9 by a suitable magnetic circuit which has not been illustrated. One of the secondary windings 7 is connected to a bank of rectifier tubes 13. The other secondary winding 9 is connected to another bank of rectifier tubes 11. The filaments 15 of the several rectifier tubes are connected to transformers 17 which are energized from the three phase power source 1. The two banks of rectifier tubes and the connections thereto constitute a full wave three phase rectifier. The output terminals 19—21 of the rectifier represent a source of pulsating direct current. The negative terminal 21 of the rectifier may be connected to ground 25 through a suitable filter reactor 23. An ammeter 24 or other current indicator may be connected between the filter reactance coil 23 and ground.

A filter condenser 36 is connected between the positive terminal 19 of the rectifier output and ground. The positive terminal 19 is also connected through a resistor 27, and a radio frequency choke coil 29 to the center tap 31 of an inductance coil 33. One terminal of a by-pass condenser 37 is connected between the junction of the resistance 27 and the radio frequency choke 29; the other terminal of the by-pass condenser is grounded.

Across the outer terminals of the center tapped inductor 33 is connected a variable capacitor 35. The terminals of the center tapped inductor 33 are also connected to the anodes 38—40 of the radio frequency amplifiers 39—41. The input 43 to the grids of the amplifier tubes may be any source of carrier frequency current which may be modulated by any appropriate means. The carrier and modulation currents may be amplified before being impressed on the radio frequency amplifiers 39—41.

It has been the custom to energize the cathodes 45—47 of the thermionic radio frequency amplifiers 39—41 by direct current from a suitable source; such as a motor generator, storage battery or rectified alternating current. This method of energizing the cathodes is both expensive and troublesome. In the case of low power tubes, unipotential cathodes may be employed and the heaters may be energized by alternating currents. This solution is not practical in the case of high power tubes; for example, tubes similar to the RCA type 207 or 862. If the cathodes are supplied with alternating current, the variations in the current often cause undesirable hum which modulates the carrier frequency. Various center tap and bucking arrangements have been used. I have tried such arrangements for minimizing the hum but I have found new disturbing currents in the cathode supply current when a three phase rectifier is connected to the same alternating current source.

The hum in question is not due to the fundamental frequency of the alternating current but is caused by a number of harmonic frequency currents which the three phase rectifier generates and induces back into the source. The harmonic frequencies which create the greatest disturbance are of the fifth and seventh order. These frequencies combine in various ways to create disturbing currents of different frequencies.

One solution which I have found practical, relatively inexpensive, and free from trouble, is to connect a series resonant circuit 49 in each of the leads from the three phase source. The series resonant circuit is composed of a capacitive reactance 51 which is balanced out by an inductive reactance 53. The combination of the inductance and capacity is series resonant to the fundamental frequency of the three phase alternating current source. At this frequency the series resonant circuit offers relatively little impedance to the flow of currents of the fundamental frequency, but for currents of the higher harmonic frequencies the inductance offers several times as much reactance which more than offsets the decrease in the reactance of the capacity. The resulting impedance is sufficient to highly attenuate the disturbing currents of harmonic frequency.

By way of example, if a three phase, two hundred and twenty volt, sixty cycle source is used, the inductor may consist of an open iron core wound with copper wire of sufficient cross section to carry the required current, and having an inductance of the order of .06 henries. The capacitor may be made in any conventional form having sufficient insulation to withstand the applied voltage and having a capacity of the order of 117.5 microfarads. The values should approximately satisfy the equation:

$$2\pi fL = \frac{1}{2\pi fC}$$

where $\pi = 3.1416$
$f =$ frequency of source
$L =$ inductance in henries
$C =$ capacity in farads After suitable series filtering the primaries 55—57 of the transformers 59—61 are arranged in the well known Scott connection. The secondaries 63—65 of the transformers are connected to the filaments 45—47.

The center tap connections of the secondaries are grounded through self-biasing resistor 67—69. The resistors are by-passed by capacitors 71—73. The outer terminals of the secondaries are by-passed to ground by capacitors 75, 77, 79, 81.

In the embodiment of my invention which I have illustrated, I have shown a source of three phase alternating current. This three phase source is connected to a suitable full wave three phase rectifier. This rectifier induces in the source a plurality of currents at harmonic frequencies. The same source is used to heat the filaments of thermionic amplifiers. Filters are provided between the source and the filaments which offer low impedance to currents of the fundamental frequency and relatively high impedance to the currents of harmonic frequencies. Although I have illustrated a series filter, it should be understood that combinations of series and shunt networks may be used, and in certain cases may be preferred.

While I have disclosed one particular arrangement and a series resonant filter, I do not intend to so limit my invention. Modifications within the scope of my invention will occur to those skilled in the art and I only wish to limit my invention as required by the prior art and the appended claims.

I claim:

1. In combination a modulator for a radio transmitter including thermionic tubes, a source of alternating current, a rectifier connected to said source and generating direct current and currents of harmonic frequency, said harmonic currents being reflected into said source; said thermionic tubes having anode circuits energized by said direct current, and cathodes energized by said alternating current, and a circuit, comprising a serially connected inductor and capacitor, interposed between said cathodes and said source offering a minimum impedance to currents of the frequency of said source and substantially higher impedance to currents of harmonic frequency.

2. In combination a modulator for a radio transmitter including thermionic tubes, a source of alternating current, a rectifier connected to said source and generating direct current and currents of harmonic frequency, said harmonic currents being reflected into said source; said thermionic tubes having anode circuits energized by said direct current, and cathodes energized by said alternating current; and a filter, comprising serially connected inductors and capacitors interposed between said cathodes and said source offering a minimum impedance to currents of the fundamental frequency of said source and substantially higher impedance to currents of harmonic frequency.

3. In combination a modulator for a radio transmitter including thermionic tubes, a source of alternating current, a rectifier connected to said source and generating direct current and currents of harmonic frequency which are reflected into said source; said thermionic tubes having anode circuits energized by said direct currents, and cathodes energized by said alternating current; and a series resonant circuit substantially resonant to the fundamental frequency of said alternating current source interposed between said cathodes and said source so that currents of said harmonic frequencies are rejected from said thermionic tubes and currents of said alternating frequency are freely admitted, whereby said harmonic frequency currents are not repeated by said modulator.

4. In a system of the character described, a thermionic tube modulator for a radio transmitter, a source of three phase alternating current, means for rectifying said three phase alternating current; a source of currents of harmonic frequencies generated by said rectifier and connections whereby said currents of harmonic frequencies are impressed on said alternating current source, said thermionic tube having grid, cathode and anode circuits, means connecting said anode circuit to said rectifying means, connections from said cathode circuit to said alternating current source, and means connected with the last mentioned connections for minimizing the effects of said currents of harmonic frequency on said thermionic tube.

5. In a system of the character described, a thermionic tube modulator for a radio transmitter, a source of three phase alternating current, a full wave rectifier connected to said alternating current source for generating direct current, and incidentally generating undesired currents of harmonic frequency which are reflected into said source, said thermionic tube having grid, cathode and anode circuits, means connecting said anode circuit to said full wave rectifier, connections from said cathode circuit to said alternating current source including a serially connected inductance and capacity each of whose combined reactance is substantially zero for the fundamental frequency of said alternating current, and of relatively high reactance for currents of harmonic frequency, whereby said harmonic frequency currents are not repeated by said modulator.

6. In a system of the character described, a modulator including a pair of push pull amplifier tubes, a source of three phase alternating current, a full wave three phase rectifier connected to said alternating current source for generating direct current, and incidental currents of harmonic frequency which are reflected into said source, said pair of push pull amplifier tubes having grid, cathode and anode circuits, connections from said anode circuits to said rectifier, a transformer for said alternating current, connections from said cathode circuits to said transformer, and filter circuits, each comprising a serially connected inductor and capacitor, interposed between said transformer and said source for minimizing the effects of said harmonic frequency currents on the operation of said pair of amplifier tubes.

LOY E. BARTON.